United States Patent Office 3,449,371
Patented June 10, 1969

3,449,371
PERFLUOROOXYDIACETIC ANHYDRIDE
James R. Throckmorton, St. Paul, Minn., assignor to Minnesota Mining and Manufacturing Company, St. Paul, Minn., a corporation of Delaware
No Drawing. Filed Apr. 8, 1968, Ser. No. 719,729
Int. Cl. C07d *15/14, 15/16*
U.S. Cl. 260—340.2          1 Claim

ABSTRACT OF THE DISCLOSURE

Cyclic perfluorinated anhydride having an ether linkage in the ring, useful as a chemical intermediate (e.g., in the preparation of nitroso-containing monomers), a heat exchange medium, or solvent. Structural formula is:

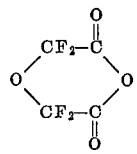

BACKGROUND OF THE INVENTION

Field of the invention

The present invention relates to a novel cyclic perfluorinated anhydride containing an ether linkage in the ring and to a method for its preparation. The compound of the invention is perfluorooxydiacetic anhydride and is represented by the structural formula:

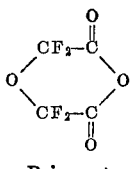

Prior art

Other cyclic perfluorinated anhydrides are known, e.g., perfluorosuccinic anhydride (U.S. Patent 2,502,478) and perfluoromaleic anhydride (U.S. Patent 2,891,968). So far as is known, however, cyclic perfluorinated anhydrides having an ether linkage in the ring have not previously been reported nor have they been suggested by the prior art.

SUMMARY OF THE INVENTION

The compound of the invention may be prepared by reacting perfluorooxydiacetic acid, or metal salts thereof, with dehydrating agents such as phosphorus pentoxide, phosphorus pentachloride, benzoyl chloride and the like, optionally in the presence of a solvent or diluent. Suitable salts, for example, are the sodium and potassium salts of perfluorooxydiacetic acid. The reactants are heated up to or near reflux and the resulting perfluorooxydiacetic anhydride is then separated by fractional distillation. Suitable solvents or diluents are optionally employed and are preferred when the starting material is a salt of perfluorooxydiacetic acid. Acceptable solvents are those which are compatible and nonreactive with the dehydrating agent employed and preferably are those with substantially higher boiling points than the anhydride, in order to facilitate fractionation of the anhydride. Examples of suitable classes of solvents are aliphatic and aromatic hydrocarbons and halogenated aliphatic and aromatic hydrocarbons. The amounts of dehydrating agent employed are not critical but should be employed in slight excess of the amount theoretically required for complete conversion to the anhydride in order to obtain the best yields. Large excesses of dehydrating agent may be detrimental.

The compound of the invention is useful as a chemical intermediate as is demonstrated by its ready conversion to the monomethyl ester of perfluorooxydiacetic acid, a compound having two functional groups of different reactivity, when treated with an alcohol such as methyl alcohol. Thus:

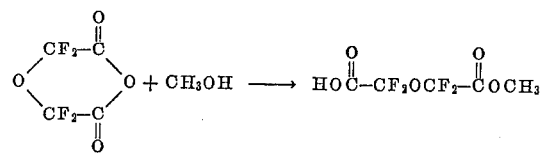

(91% yield), whereas the conversion of perfluorooxydiacetic acid directly to the monomethyl ester proceeds only in substantially reduced yields. The resulting monomethyl ester is useful as a starting material for a series of steps leading to the difunctional telomer acid,

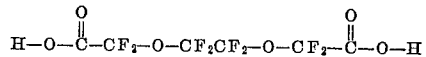

claimed in U. S. Patent 3,250,806, Warnell, issued May 10, 1966. Said telomer acid or derivatives thereof, such as, telomer diacid fluoride are useful as monomers which polymerize to form sealants, binders, elastomers and the like. The process for its preparation using the monoethly ester as a starting material may be represented by the following reactions:

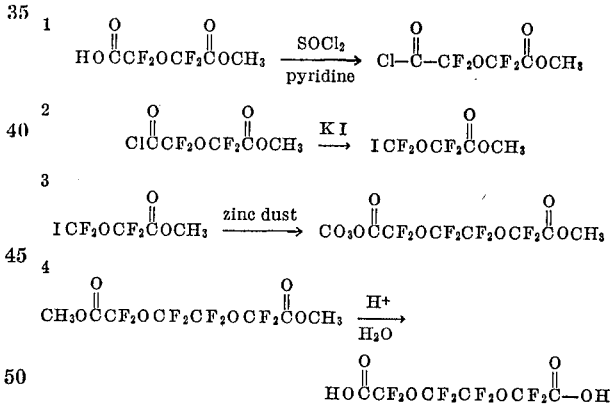

Furthermore, the novel perfluorooxydiacetic anhydride, as well as the monomethyl ester resulting from the reaction of the anhydride with methanol, may be readily polymerized with a diol such as ethylene glycol, the resulting polymer being useful as an elastomer, binder, sealant, or the like. The anyhydride may further be employed as, for example, a heat exchange medium or as a solvent in systems where its reactivity will not interfere with the reaction (as, for example, in reaction (3), above).

The compound of the invention is also useful as an intermediate in the synthesis of nitroso-cointaining monomers having utility in the preparation of functionally substituted nitroso polymers. Such polymers are useful as oxidizer-resistant rubbers, greases, waxes and elastomers useful at low temperatures.

As examples of such monomer syntheses, perfluorooxydiacetic anhydride is readily converted to dinitrosyl perfluorooxydiacetate (1) by reaction with dinitrogen trioxide and to methyl nitrosyl perfluorooxydiacetate (2) by reaction with methyl nitrate:

(1) 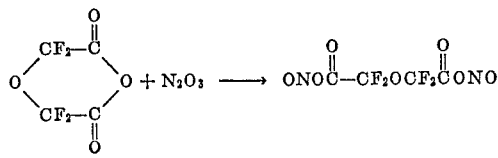

(2) 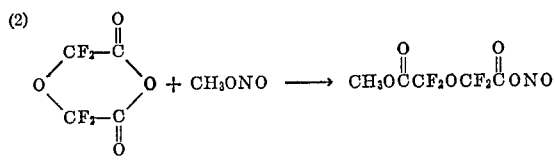

The perfluorooxydiacetates resulting from the above two reactions are then readily convertible to functionally substituted nitroso monomers as follows:

(3) 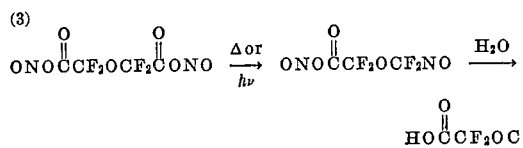

(4) 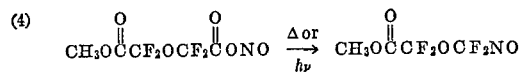

These nitroso-monomers are copolymerized with trifluoronitrosomethane and tetrafluoroethylene to form the corresponding nitroso polymers having utility as indicated above.

Other uses of perfluorooxydiacetic anhydride include its utility as a dehydrating agent and its reactability with perfluoroimidoyl amidines and poly(perfluoroimidoyl amidines) to form monomeric and polymeric triazine rings with pendant carboxyl groups which are useful as crosslinking sites.

The following examples are provided to more specifically describe the compound of the invention.

EXAMPLE I 103.5 grams of perfluorooxydiacetic acid were combined with 99.4 grams of phosphorus pentoxide in a distilling flask fitted with a reflux condenser. The reaction mixture was mechanically stirred while heating to reflux temperature. Perfluorooxydiacetic anhydride was removed from the reaction mixture by distillation. Further purification was carried out by redistillation. The resulting purified product boiled at 64° C./atmospheric pressure. Yield: 71 grams (82%).

EXAMPLE II 122 grams of phosphorus pentachloride were added in five equal portions to a suspension of 150 grams of the disodium salt of perfluorooxydiacetic acid in 200 milliliters of a polynuclear chlorinated aromatic hydrocarbon solvent while the temperature was maintained at 100° C. After the addition of each portion of phosphorus pentachloride, the volatile reaction products were removed by distillation under reduced pressure. Redistillation yielded 72 grams (63%) of the anhydride.

The structure of the resulting perfluorooxydiacetic anhydride was established as follows.

*Elemental analysis.*— Calculated for $C_4F_4O_4$ (molecular weight 188.04): C, 25.55; F, 40.42. Found: C, 25.40; F, 40.10.

Infrared spectrum of the anhydride showed an absorption at 5.44μ assigned to carbonyl. The ultraviolet spectrum of the anhydride (in n-hexane) showed an absorption at 230 mμ (E 86).

The fluorine [19] magnetic resonance spectrum of the anhydride showed a single peak at 74.5φ* which was consistent with the assigned structure.

The mass spectrum showed a cracking pattern consistent with the assigned structure.

What is claimed is:
1. The compound represented by the structural formula:

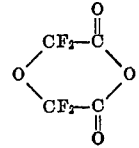

References Cited

Banks et al.: Chem. Soc. Journ. (London), 1965, part 5, pp. 6077–83.

ALEX MAZEL, *Primary Examiner.*

JAMES H. TURNIPSEED, *Assistant Examiner.*

U.S. Cl. X.R.

106—311; 252—67; 260—2, 75, 483, 484, 535, 545